(12) United States Patent
Rotta et al.

(10) Patent No.: US 10,716,429 B2
(45) Date of Patent: Jul. 21, 2020

(54) MACHINE FOR PREPARING BEVERAGES, IN PARTICULAR ESPRESSO COFFEE, AND VALVE AND VALVE UNIT FOR USE THEREIN

(71) Applicant: Luigi Lavazza S.p.A., Turin (IT)

(72) Inventors: Denis Rotta, Turin (IT); Andrea Colonna, Turin (IT); Luciano Gabriele Picone, Pino Torinese (IT); Simone Rosetta, Quarona (IT); Danilo Bolognese, Turin (IT)

(73) Assignee: Luigi Lavazza S.p.A., Turin (IT)

( * ) Notice: Subject to any disclaimer, the term of this patent is extended or adjusted under 35 U.S.C. 154(b) by 352 days.

(21) Appl. No.: 15/736,828

(22) PCT Filed: Jun. 14, 2016

(86) PCT No.: PCT/IB2016/053490
§ 371 (c)(1),
(2) Date: Dec. 15, 2017

(87) PCT Pub. No.: WO2016/203363
PCT Pub. Date: Dec. 22, 2016

(65) Prior Publication Data
US 2018/0360260 A1    Dec. 20, 2018

(30) Foreign Application Priority Data

Jun. 17, 2015   (IT) .......................... 102015000024807

(51) Int. Cl.
*A47J 31/46*      (2006.01)
*A47J 31/36*      (2006.01)
*F16K 31/12*      (2006.01)

(52) U.S. Cl.
CPC ......... *A47J 31/469* (2018.08); *A47J 31/3676* (2013.01); *A47J 31/461* (2018.08);
(Continued)

(58) Field of Classification Search
CPC ........ A47J 31/461; A47J 31/46; A47J 31/462; A47J 31/3676; A47J 31/468; A47J 31/469; F16K 31/12; A41J 31/40; A41J 31/402
(Continued)

(56) References Cited

U.S. PATENT DOCUMENTS

| | | | | |
|---|---|---|---|---|
| 3,596,675 A | * | 8/1971 | Krueger | A47J 31/54 137/389 |
| 5,487,403 A | * | 1/1996 | Mollo | F04C 14/26 137/115.16 |
| 2014/0150664 A1 | * | 6/2014 | Corti | A47J 31/0647 99/283 |

FOREIGN PATENT DOCUMENTS

| | | |
|---|---|---|
| EP | 2 369 963 | 12/2012 |
| IT | TO2014A001002 A | 12/2014 |
| WO | 2016/087996 A1 | 6/2016 |

OTHER PUBLICATIONS

International Search Report and Written Opinion of the ISA of PCT/IB2016/053490, dated Aug. 25, 2016, 9 pages.

* cited by examiner

*Primary Examiner* — Sarang Afzali
*Assistant Examiner* — Darrell C Ford
(74) *Attorney, Agent, or Firm* — Nixon & Vanderhye P.C.

(57) ABSTRACT

A machine for preparing beverages, in particular espresso coffee, comprises a hydraulic circuit including a brewing unit, a water tank, a pump having the inlet connected in fluid communication to the tank, and the outlet or delivery connected in fluid communication to the brewing unit. A normally closed one-way hydraulic valve, which is set between the pump and the brewing unit, enables a flow of water toward the brewing unit when the pressure of the
(Continued)

water delivered by the pump exceeds a substantially predetermined threshold. There is a heating means for heating the water delivered by the pump. The machine has a normally open discharge valve having a main inlet ($12_{IN}$), connected between the one-way hydraulic valve and the brewing unit, a main outlet, connected toward a discharge space, and an open/close member set between the main inlet and the main outlet, designed to assume an open condition and a closed condition, where it enables and prevents, respectively, a flow of fluid between the inlet and the outlet, with the open/close member being urged by a corresponding spring into the open condition. The discharge valve is a hydraulically driven valve, which includes a chamber for hydraulic driving of the open/close member, an auxiliary inlet of the driving chamber, connected to the delivery of the pump, and an auxiliary outlet of the driving chamber, connected to the brewing unit, in such a way that water forced by the pump passes through the driving chamber before reaching the brewing unit. The discharge valve has a further outlet of the driving chamber, connected in fluid communication to a device for spillage of water from the driving chamber, in particular towards one of the water tank and the inlet of the pump.

20 Claims, 7 Drawing Sheets

(52) U.S. Cl.
CPC ........... *A47J 31/462* (2013.01); *A47J 31/468* (2018.08); *F16K 31/12* (2013.01)

(58) Field of Classification Search
USPC .... 99/300–309; 137/115.13, 115.16, 115.26, 137/115.28
See application file for complete search history.

MACHINE FOR PREPARING BEVERAGES, IN PARTICULAR ESPRESSO COFFEE, AND VALVE AND VALVE UNIT FOR USE THEREIN

This application is the U.S. national phase of International Application No. PCT/IB2016/053490 filed Jun. 14, 2016, which designated the U.S. and claims priority to IT Patent Application No. 102015000024807 filed Jun. 17, 2015, the entire contents of each of which are hereby incorporated by reference.

FIELD OF THE INVENTION

The present invention relates, in general, to machines for preparing beverages, in particular espresso coffee, and has been developed with particular reference to discharge valves for these machines.

According to an aspect thereof, the subject of the invention is consequently a machine of the type comprising a hydraulic circuit that includes:
- a brewing unit;
- a water tank;
- a pump having the inlet connected in fluid communication to said tank and the outlet or delivery connected in fluid communication to the brewing unit;
- a normally closed one-way hydraulic valve, set between the pump and the brewing unit, for enabling a flow of water towards the brewing unit when the pressure of the water delivered by the pump exceeds a substantially predetermined threshold;
- heating means for heating the water delivered by the pump; and
- a normally open discharge valve having:
    - a main inlet, connected between said one-way hydraulic valve and the brewing unit;
    - a main outlet, connected towards a discharge space; and
    - an open/close member, which is set between the main inlet and the main outlet and is designed to assume an open condition and a closed condition, in which it enables and prevents, respectively, a flow of fluid between said inlet and said outlet, the open/close member being urged by a corresponding spring into the open condition.

PRIOR ART

A machine of the type referred to is described in the Italian patent application TO2014A001002, filed on Dec. 18, 2014.

In the machine described in the aforesaid prior document, the discharge valve is a normally open two-way and two-position solenoid valve. During operation, when delivery of the beverage has ended, the hydraulic circuit of the machine is discharged through the solenoid valve, which, once de-energized by the control unit of the machine, opens a discharge passage, which enables the pressurized water comprised between the brewing unit and the one-way valve to flow into a collection container, such as a so-called dripping tray.

This measure is principally adopted to prevent the aforesaid pressurized water from possibly causing undesired dripping from the supply mouth of the machine even after the end of delivery of the beverage. Moreover, discharge of the aforesaid pressurized water significantly facilitates re-opening of the brewing unit, when this is a manually operated one.

The known solution referred to above functions excellently, but is rather costly, in view of the fact that the discharge valve is a solenoid valve, which must be connected to the control unit of the machine via a purposely provided electrical control line. The control unit must moreover be provided with suitable components for driving a valve of this sort.

In addition, the disadvantage deriving from the use of an electromagnetic solenoid, assigned to which is actuation of the open/close element of the discharge valve should be considered: it is known that the mechanical forces available for such actuation vary in a way proportional to the amount of copper that constitutes the coil of the solenoid. The technical solutions used, in order to reduce the cost of the component, consist in limiting the internal hydraulic sections of the discharge valve: this entails, however, the disadvantage of potential soiling and blocking of the solenoid-valve component, during its service life.

A machine for preparing beverages and a discharge valve is disclosed by EP-B-2369963.

AIMS AND SUMMARY OF THE INVENTION

The present invention is basically aimed at overcoming the aforesaid drawbacks, via a machine for preparing beverages of the type referred to at the start of the present description that presents a low cost, ensures reliable operation, and has simplified electrical wiring. A further object of the invention is to provide a valve that is particularly suitable for use in a machine of the type referred to.

The above and further aims are achieved, according to the invention, with a machine of the type specified above, wherein:
the discharge valve is a hydraulically driven valve, which comprises a chamber for hydraulic driving of the open/close element, an auxiliary inlet of the driving chamber, connected to the delivery of the pump,
the discharge valve moreover has an outlet of the driving chamber, connected in fluid communication to a device for spillage of water from the driving chamber, in particular towards one of the water tank and the inlet of the pump,
the machine being characterized in that the driving chamber has an auxiliary outlet connected to the brewing unit, in such a way that water forced by the pump passes through the driving chamber before reaching the brewing unit, the arrangement being such that:
after the pump is activated for preparation of the beverage, the open/close member passes from the open condition to the closed condition, overcoming the force of the corresponding spring as a result of the pressure of the water in the driving chamber determined by operation of the pump; and
after the pump is de-activated at the end of delivery of the beverage, the pressure in the driving chamber decreases as a result of the spillage determined by the spillage device, thus enabling the open/close element to return into the open condition as a result of the force of the spring and of the pressure present at the main inlet of the discharge valve.

Preferably, the hydraulically driven discharge valve comprises a secondary chamber, which houses the return spring, i.e., the spring that urges the open/close member towards its open position. The secondary chamber is in flow communication with the main inlet of the discharge valve in such a way that the open/close member passes from the closed condition to the open condition as a result of the pressure in the secondary chamber and of the force of the spring contained therein.

In a preferred embodiment, the spillage device is constituted by a device for self-priming.

In a particularly advantageous embodiment, the discharge valve and the spillage device are integrated in a single valve unit.

Hence, also forming the subject of the present invention is a discharge valve and valve unit for use in a machine for preparing beverages of the type defined above.

BRIEF DESCRIPTION OF THE DRAWINGS

Further objects, characteristics, and advantages of the invention will emerge from the ensuing detailed description, which is provided purely by way of non-limiting example, with reference to the attached drawings, wherein.

DESCRIPTION OF PREFERRED EMBODIMENTS

In the ensuing description, various specific details are illustrated aimed at providing an in-depth understanding of the embodiments. The embodiments may be obtained without one or more of the specific details, or with other methods, components, materials, etc. In other cases, structures, materials, or operations that are known or evident for a person skilled in the sector are not shown or described in detail so that the various aspects of the embodiments will not be obscured. Reference to "an embodiment" or "one embodiment" in the framework of the present description is meant to indicate that a particular configuration, structure, or characteristic described in relation to the embodiment is comprised in at least one embodiment. Hence, phrases such as "in an embodiment", "in one embodiment", and the like, that may be present in various points of the present description do not necessarily refer to one and the same embodiment. In addition, particular conformations, structures, or characteristics may be combined in any adequate way in one or more embodiments. The references used herein are only provided for convenience and hence do not define the sphere of protection or the scope of the embodiments.

Figure 1:
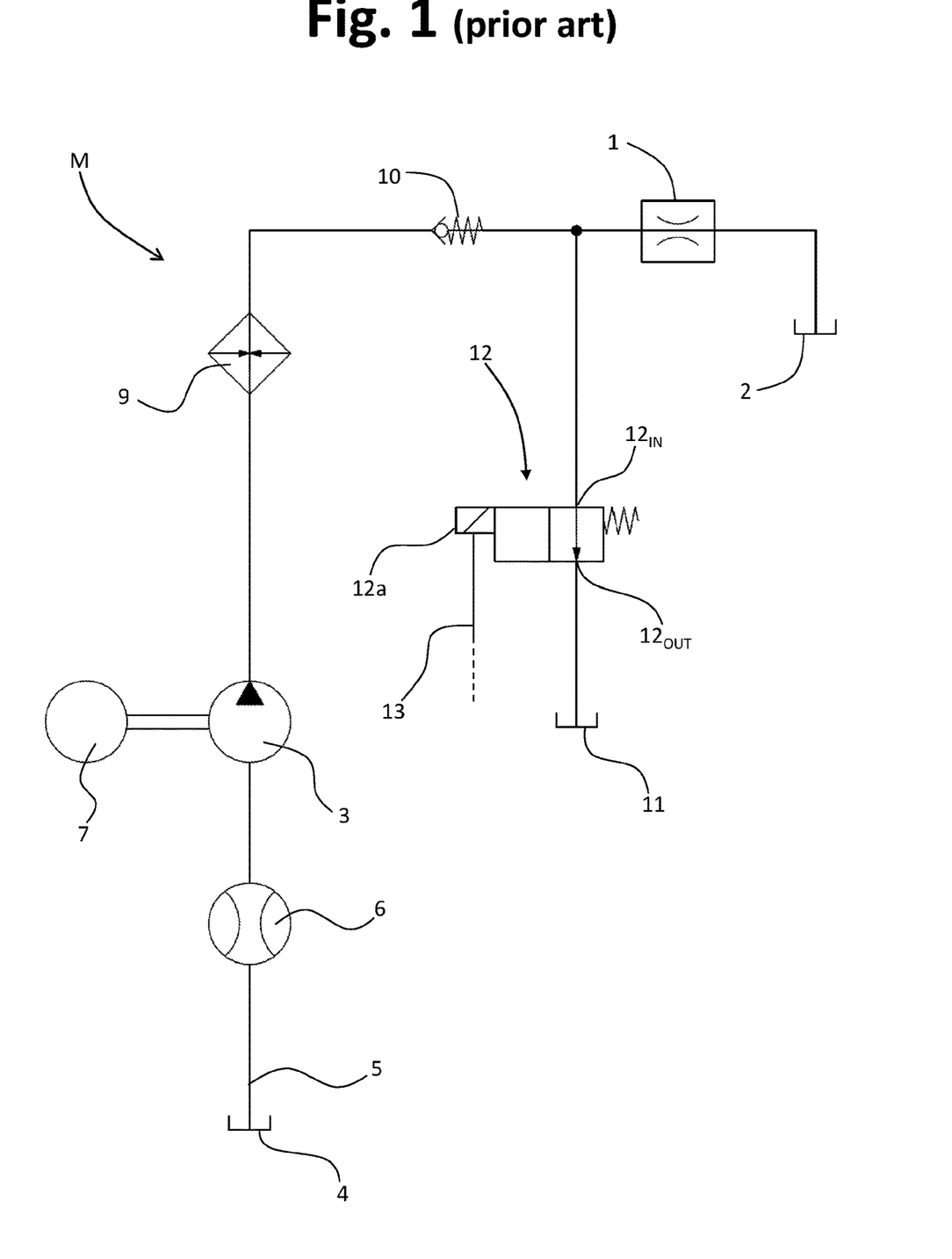
FIG. 1 is a schematic illustration of a machine for preparing beverages according to the prior art.

Designated as a whole by M in FIG. 1 is a machine for preparing beverages according to the prior art. The above machine M comprises a hydraulic circuit including a brewing unit 1, which from the hydraulic standpoint is substantially equivalent to a choke, for delivering a beverage into a collection container 2, such as a coffee cup or the like.

An electric pump 3 has its inlet connected to a water tank 4 via an intake duct 5 along which a flow-meter 6 can be inserted, for example of the turbine type, in order to supply electrical signals (pulses) indicating of the flowrate of water taken in by the pump 3. The pump 3 may be a vibration electric pump, or else a pump driven by an electric motor 7, of a type in itself known.

The pressurized water delivered at output from the pump 3 then reaches an electrical heating device or boiler 9, and from here it proceeds towards the brewing unit 1. Set between the heating device 9 and the brewing unit 1 is a normally closed one-way hydraulic valve 10, designed to enable a flow of water towards the brewing unit 1 when the pressure of the water coming from the pump 3 exceeds a pre-set threshold value, of for example to 2 bar.

Designated by 12 is a discharge valve, in the form of a two-way and two-position solenoid valve, having the inlet $12_{IN}$ connected between the outlet of the one-way valve 10 and the inlet of the brewing unit 1, and the outlet $12_{OUT}$ connected to a discharge container 11, such as for example the drip-collecting tray or drawer with which a machine for preparing coffee is usually provided.

In the machine according to the prior art described above the discharge solenoid valve 12 represents a rather costly component. It comprises, in fact, an energization solenoid 12a, which must be connected to a control unit (not illustrated) of the machine M via a purposely provided electrical line 13. Moreover, as mentioned in the introductory part of the present description, the need to limit the amount of copper of which the coil of the solenoid 12a is made means that the valve has a low mechanical force of actuation, and for this reason the hydraulic sections inside the valve itself are small, typically having a diameter of approximately 1 mm: this circumstance entails the risks of soiling, clogging, and blocking of the component.

A substantial saving and improvement of operating performance can be achieved with the solution according to the present invention, an embodiment of which will now be described with reference to FIG. 2. In this figure parts and elements that have already been described are once again designated by the same reference numbers as the ones used previously.

Figure 2:
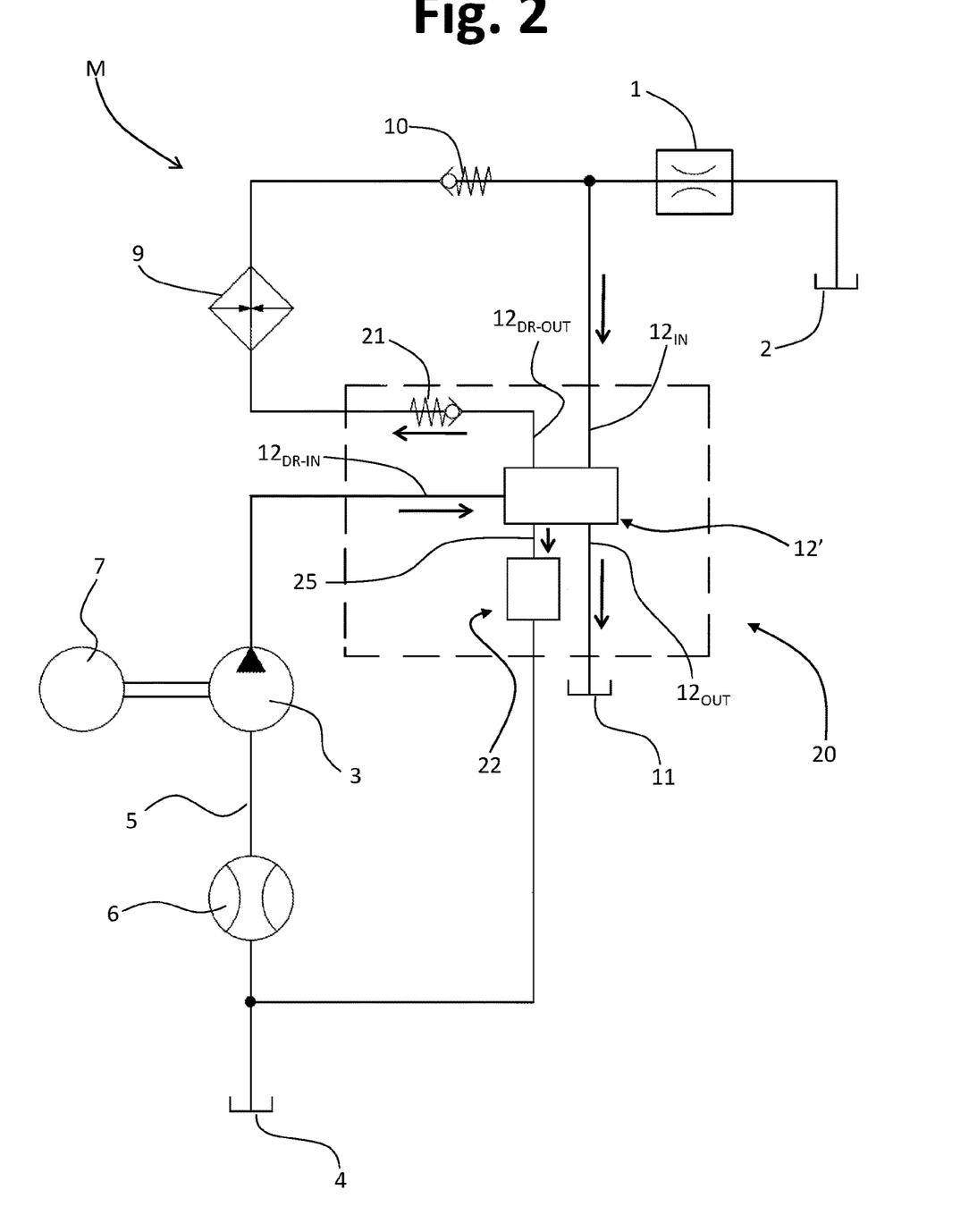
FIG. 2 shows a principle diagram of a machine for preparing beverages according to the present invention.

In the machine M according to FIG. 2 the discharge valve, designated as a whole by 12', is a hydraulically driven valve, and operatively associated thereto is a device for controlled spillage, such as a self-priming valve. In preferred embodiments, the hydraulically driven discharge valve and the aforesaid spillage device are integrated in a single valve unit, such as the one designated by 20 in FIG. 2.

In various embodiments, the valve 12' is a hydraulically driven discharge valve, which comprises:

- a main inlet $12_{IN}$, designed for connection to the hydraulic circuit of the machine M between the one-way valve 10 and the brewing unit 1;
- a main outlet $12_{OUT}$, designed to be connected in fluid communication to the discharge container, or other some discharge space;
- an auxiliary inlet $12_{DR-IN}$, designed to be connected to the delivery of the pump 3;
- an auxiliary outlet $12_{DR-OUT}$, designed for connection with the brewing unit 1, upstream of the one-way valve 10, preferably associated to which is a further one-way valve 21; and
- a further outlet 25, which is designed to be set in fluid communication with a device 22 for controlled spillage of water forced by the pump, preferably represented by a self-priming valve, where this device 22 has an outlet communicating with the intake duct 5, preferably upstream of the flow-meter 6, or else directly with the tank 4.

Figure 7:
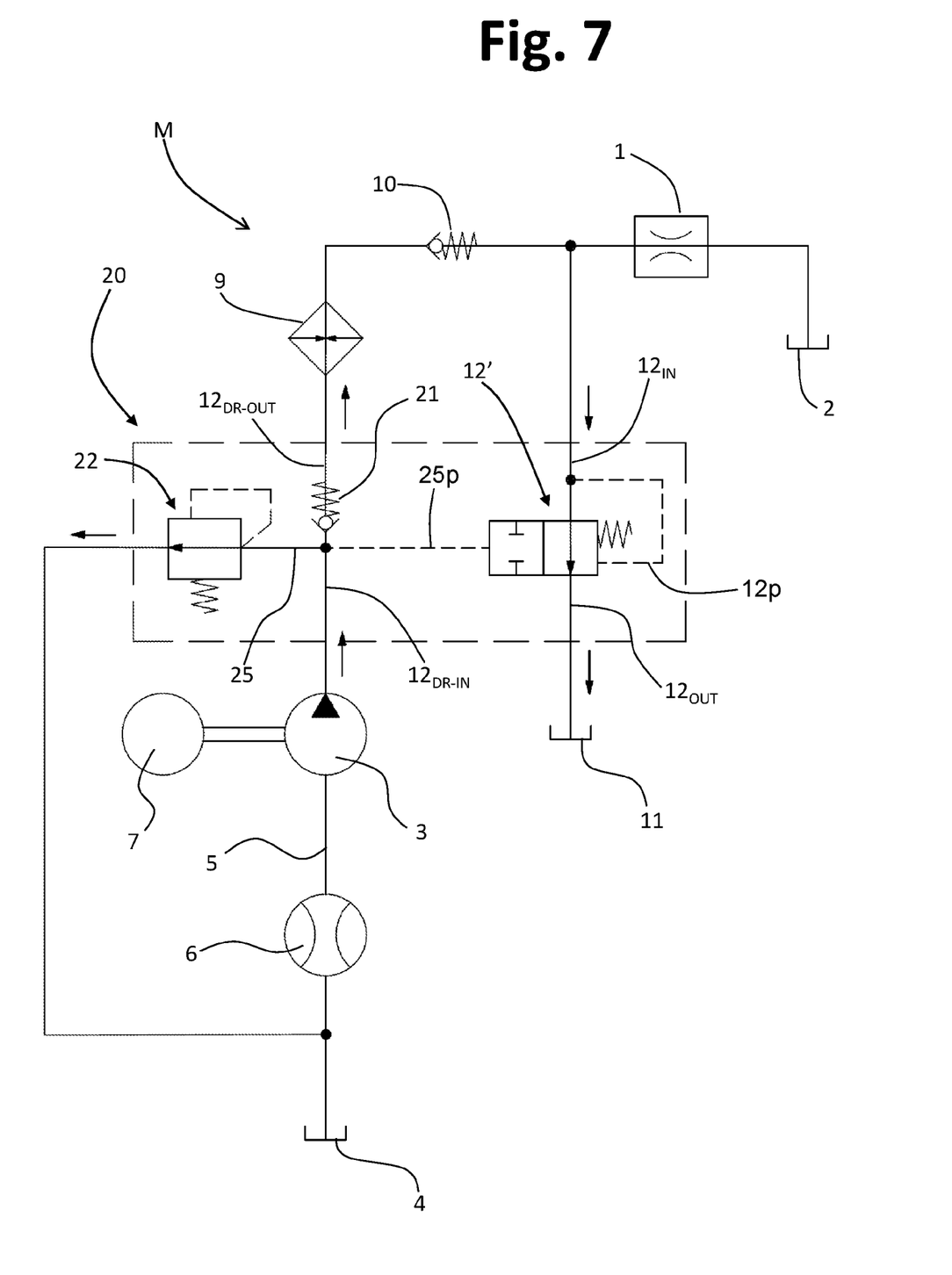
FIG. 7 illustrates the hydraulic diagram of the machine of FIG. 2, with highlighted the hydraulic pilot lines of a corresponding discharge valve.

As will emerge from what follows, the outlet 25 and the main inlet $12_{IN}$ provide respective driving or pilot lines of the valve 12'—designated, respectively, by 25p and 12p in the hydraulic diagram of FIG. 7—one set between the inlet $12_{DR\text{-}IN}$ and the outlet $12_{DR\text{-}OUT}$, upstream of the one-way valve 21, and the other set between the inlet $12_{IN}$ and the outlet $12_{OUT}$.

In preferred embodiments, the spillage device 22, preferably a self-priming valve, is integrated in the further outlet 25, with the valve 12' and the device 22 that provide an integrated valve unit 20.

The inlet $12_{IN}$ and the outlet $12_{OUT}$ are here defined as "main" in so far as they are linked to the function of main discharge of the valve 12', in addition to hydraulic driving in opening of an open/close member thereof. Instead, the inlet $12_{DR\text{-}IN}$ and the outlet $12_{DR\text{-}OUT}$ are here defined as "auxiliary" in so far as they are essentially linked to functions of hydraulic driving in closing of the aforesaid open/close member of the valve 12'.

As will be seen, the arrangement is such that, after the pump 3 is activated for preparation of a beverage, the hydraulically driven discharge valve 12' switches from its normally open condition to its closed condition. Next, once delivery of the beverage has ended, the pump 3 is de-activated and, thanks both to the connection 25 to the spillage device 22 and to the presence of the aforesaid hydraulic opening and closing pilot lines (designated by 12p and 25p, respectively, in FIG. 7), the valve 12' returns to its normal open condition, which enables discharge of the residue of water present in the part of the circuit comprised between the one-way valve 10 and the brewing unit 1, likewise enabling evacuation of possible particulate in suspension.

The valve 12', or the valve unit 20 that integrates it together with the device 22, presents a simplified structure, and for its control there is not required either a solenoid or a dedicated electrical line or any electrical/electronic driving component.

Figure 3:
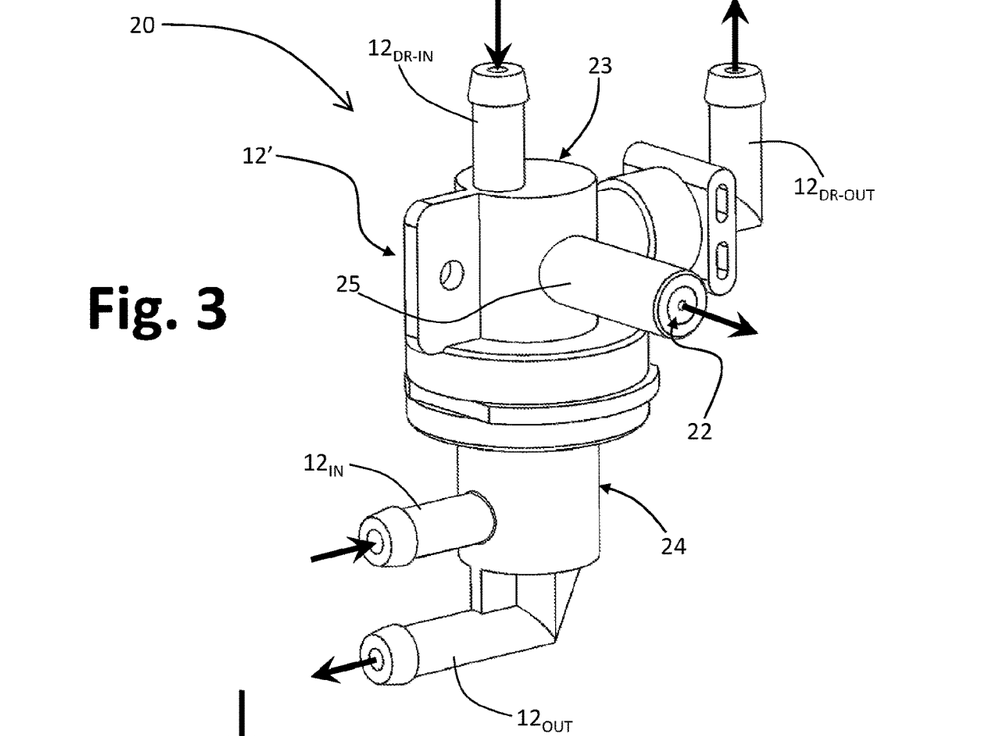
FIGS. 3 and 4 illustrate, via schematic perspective views, a valve unit that can be used according to the present invention.
Figure 4:
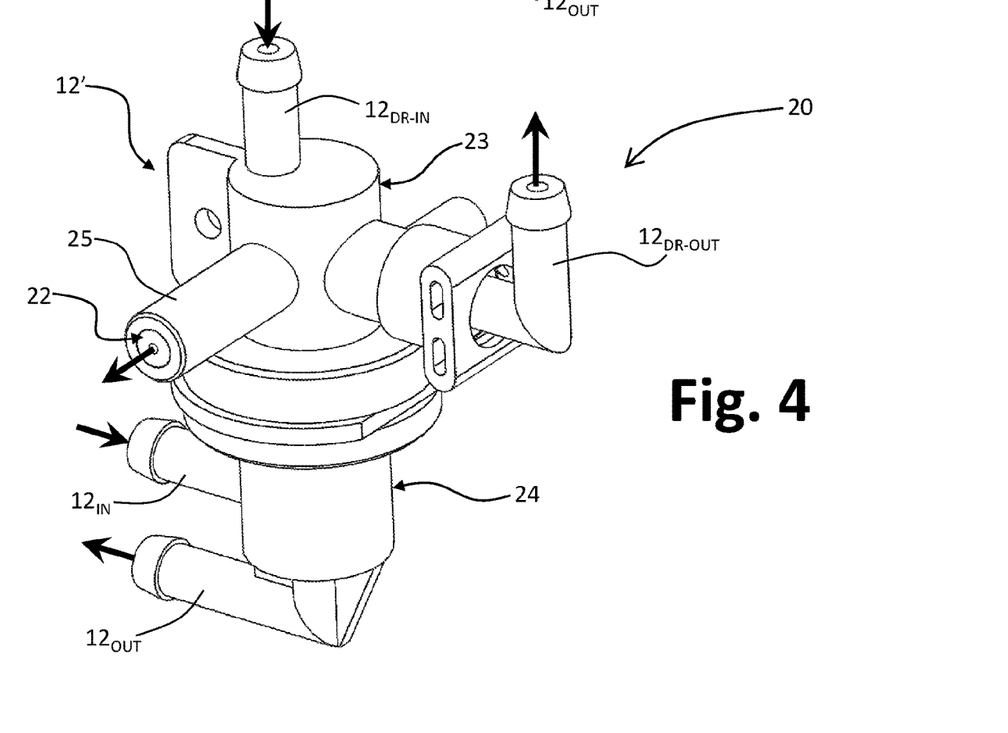

FIGS. 3 and 4 illustrate a possible embodiment of the valve 12', or of a valve unit 20, that can be used in the machine M of FIG. 2.

The valve 12' comprises a hollow body, which, in the embodiment illustrated, is formed by two elements 23 and 24, for example made of moulded plastic material, joined together in a fluid-tight way, for instance by means of a threaded coupling.

The element 23 is substantially cup-shaped in order to define an inner chamber. Coupled in a fluid-tight way to one end of the element 23 is the element 24, which is also substantially cup-shaped to define an inner chamber of its own.

In the example illustrated, branching off from the element 23 are two tubular connectors that provide the auxiliary inlet $12_{DR\text{-}IN}$ and the auxiliary outlet $12_{DR\text{-}OUT}$, as well as a tubular connector 25, to which the spillage device 22 is to be associated. Preferably, the connector that provides the outlet $12_{DR\text{-}OUT}$ is configured in two parts coupled together in a fluid-tight way (see FIG. 5) in order to enable housing therein of the one-way valve 21. As will be seen hereinafter, the inlet $12_{DR\text{-}IN}$, the outlet $12_{DR\text{-}OUT}$, and the connector or duct 25 are in fluid communication with the inner chamber of the element 23. Once again with reference to the example of FIGS. 3 and 4, branching off from the element 24 are the tubular connectors that provide the main inlet $12_{IN}$ and the main outlet $12_{OUT}$. Also in this case, as will be seen hereinafter, the inlet $12_{IN}$ and the outlet $12_{OUT}$ are in fluid communication with the inner chamber of the element 24.

Figure 5:
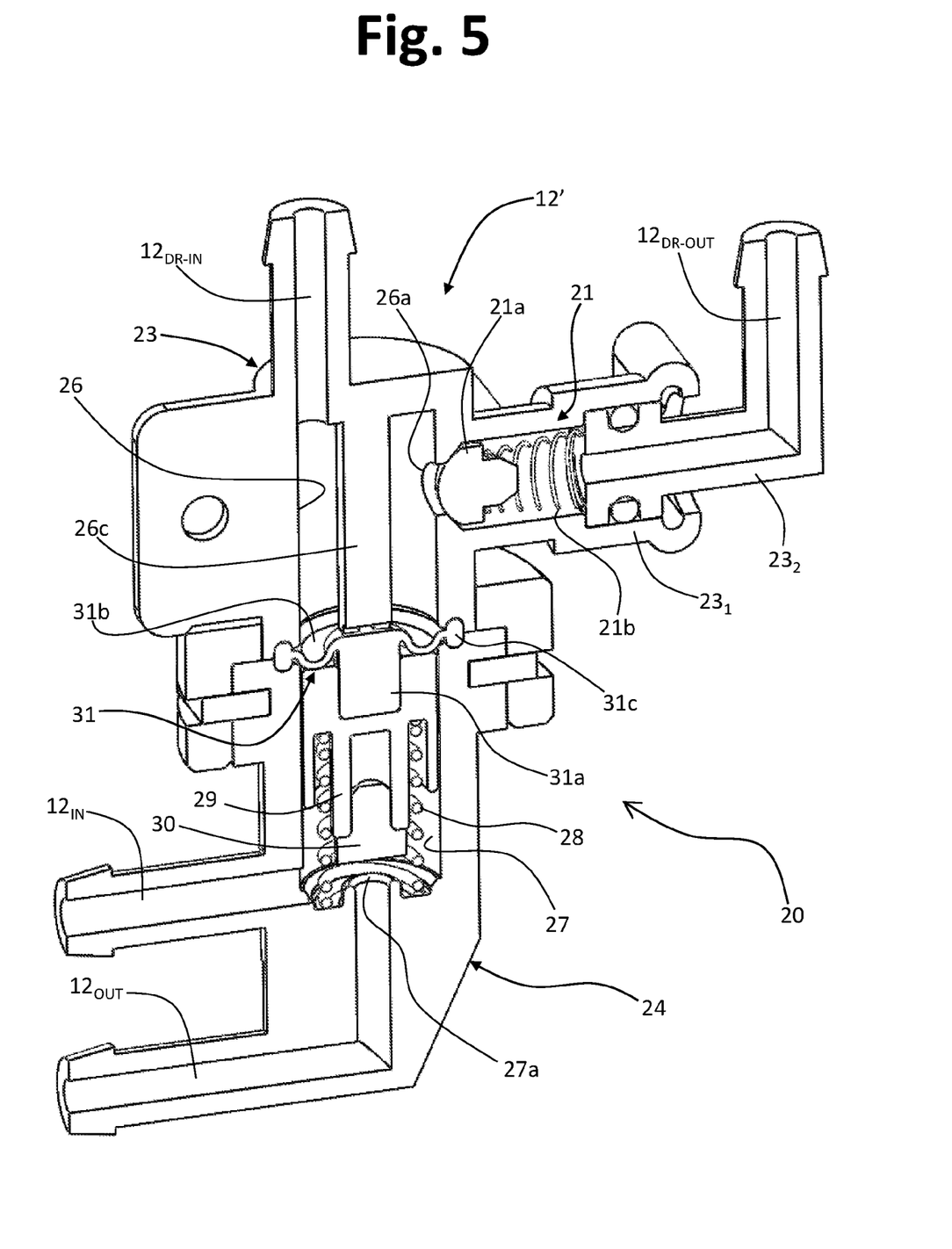
FIGS. 5 and 6 illustrate, via respective schematic axial sections, a valve unit that can be used according to the present invention.
Figure 6:
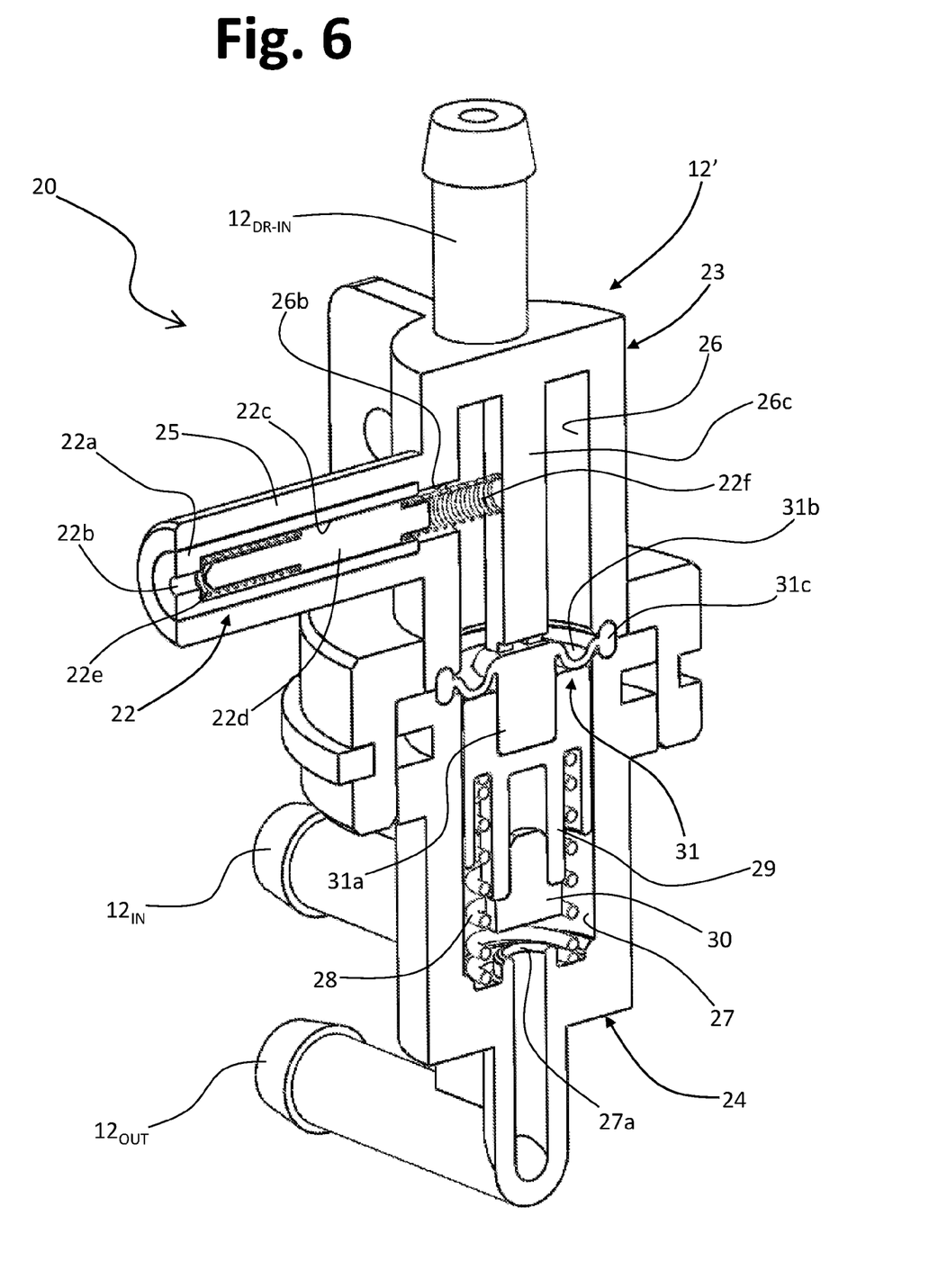

The internal structure of the valve unit 12 may be clearly seen in FIGS. 5 and 6. In these figures, designated by 26 is the aforesaid inner chamber of the element 23, which is substantially cylindrical, in fluid communication with the driving inlet $12_{DR\text{-}IN}$, here defined at the top of the element 23. The chamber 26 has a first lateral port 26a (FIG. 5), belonging to the driving outlet $12_{DR\text{-}OUT}$, on which an open/close element 21a of the one-way valve 21 operates. The one-way valve 21 prevents any potential reflux of hot water, coming from the heater, towards the cavity of the body 23. This valve 21 further comprises a calibrated helical spring 21b, designed to urge constantly the open/close element 21a into the respective position of closing of the port 26a. The valve 21 is housed within the duct corresponding to the outlet $12_{DR\text{-}OUT}$, which, as already mentioned, is made up of two tubular parts $23_1$, $23_2$ coupled together in a fluid-tight way. The structure formed by two parts is aimed at enabling assembly of the valve 21 within the connector that provides the outlet $12_{DR\text{-}OUT}$. The chamber 26 has a second lateral port 26b (FIG. 6) extending outwards from which is the tubular connector or duct 25, which, in preferred embodiments, houses inside it the spillage device 22.

In preferred embodiments, the device 22 is a self-priming valve. This valve 22 may be of any type known in the field for use in combination with small pumps, in particular vibration pumps. In the example of embodiment illustrated in FIG. 6, the valve 22 is of the commercially available type and basically consists of a cylindrical body 22a having an axial cavity with two stretches of different diameter, the stretch of smaller diameter providing an outlet 22b of the valve 22. Slidably housed in the stretch of cavity of larger diameter, designated by 22c, is a piston 22d, having portions of restricted section at its two axial ends. Fitted on each of the aforesaid portions is the proximal end of a respective helical spring 22e, 22f. In the example illustrated, the spring 22e is entirely inside the stretch 22c of the axial cavity of the body 22a, with its end that bears upon the restriction that defines the outlet 22b. The spring 22f extends, instead, through the port 26b, with its distal end bearing upon an inner surface of the chamber 26, here a surface defined by a central axial relief of the chamber itself, designated by 26c. The springs 22e and 22f are calibrated for keeping the piston 22d in a substantially pre-determined intermediate position within the stretch 22d of the axial cavity of the body 22a. The piston 22d has an intermediate portion of a diameter substantially corresponding to that of the stretch of cavity 22d, provided on the surface with recesses that enable in any case a modest passage of liquid between the inlet of the body 22a, here substantially at the port 26c, and the outlet 22a. It should be noted that, even in the condition of maximum compression of the spring 22e, the piston 22d might not determine closing of the outlet 22b in such a way that the valve 22 might always allow seepage of liquid, in the presence of pressurized water in the chamber 26.

The device for self-priming 22 that can be used for implementation of the invention may even be of a type different from what has been exemplified herein, without prejudice to its functionality, which basically consists in allowing a modest spillage of liquid from the port 26b, which tends to eliminate the air that may be present in the hydraulic circuit downstream of the pump 3.

Once again in FIGS. 5 and 6, designated by 27 is the aforesaid inner chamber of the element 24, which is substantially cylindrical, in fluid communication with the main inlet $12_{IN}$ of the unit 20, here defined by a connector in a radial position on the element 24. The chamber 27 has a port 27a, here defined at the centre on the bottom of the chamber 27, in fluid communication with a connector that provides the main outlet $12_{OUT}$. Preferably, the port 27a is defined at a valve seat, preferably formed by a tubular relief of the bottom of the chamber 27.

Bearing upon the bottom of the chamber 27, around the seat 27a, is the first end of a calibrated helical spring 28, the second end of which bears instead upon a corresponding seat defined in a piston 29, mounted in an axially slidable way in the chamber 27. Associated to the lower end of the piston 29 is an open/close element 30, which is able to close the outlet port 27a, whereas constrained to its upper end is a membrane element, designated as a whole by 31. The membrane element may be conveniently made of elastic or resilient material, such as a rubber or a silicone. As will be seen, the elements 29-31 provide as a whole a hydraulically driven open/close element of the valve 12'.

In the example, the element 31 has a lower portion 31a inserted in a respective housing defined at the top of the piston 29. This portion 31a projects at the centre from a membrane portion 31b, the external edge 31c of which is constrained in a respective seat, not represented, defined between two surfaces of interface of the elements 23 and 24. This coupling, or the aforesaid seat, is sized to guarantee itself liquid-tightness towards the outside of the valve body. As may be noted, the two chambers 23 and 24 are substantially coaxial to one another and separated in a fluid-tight way from one another by means of the membrane element 31, in particular by its membrane portion 31b.

With reference also to FIG. 7, operation of the valve unit 20 of FIGS. 3-6 is described in what follows.

For preparation of a beverage, the necessary dose of precursor of the beverage, for example ground coffee contained in a capsule, is introduced in the brewing unit 1 (FIG. 2), according to modalities in themselves known. The user then governs delivery of the beverage, with consequent starting of the pump 3.

During the first phases of delivery, the water arriving from the pump 3 reaches the chamber 26 via the driving inlet $12_{DR-IN}$, filling it progressively. When the pressure of the water in the chamber 26 exceeds the value of calibration of the spring 21b of the one-way valve 21, which is relatively low, the corresponding open/close element 21a displaces, thus opening the port 26a: in this way, the water forced by the pump 3 can flow through the heating device 9, the one-way valve 10, and the brewing unit 1, in order to enable delivery of the beverage into the container 2.

At the same time, the pressure of the water in the chamber 26 exceeds the value of calibration of the spring 28 present in the chamber 27 (through the pilot line 25p of FIG. 7), causing bending of the membrane portion 31b of the element 31 and thereby translation of the piston 29 downwards (as viewed in the figures). In this way, the open/close element 30 is brought into contact with the upper edge of the tubular relief defined in which is the port 27a, which is thus closed. During this initial phase, the self-priming valve 22 in fluid communication with the chamber 23 in any case guarantees the presence of pressurized water in the chamber 26, at the same time enabling limitation of the presence of air in the circuit downstream of the pump 3. The modest amount of water that traverses the self-priming valve 22 is clean water and can thus be made to flow towards the tank 4, via the connector 25, to which a purposely provided tube can be connected.

Then, during delivery of the beverage, the pressurized water comprised between the brewing unit 1 and the one-way valve 10 can reach the inside of the chamber 27, through the main inlet $12_{IN}$ This water, which may contain residue of the beverage and/or of its precursor (for example, ground coffee) cannot flow out through the port 27a, given the closed condition of the latter by the open/close element 30. Consequently, the pressure created in the chamber 27 acts for opening, in addition to the compressed spring. This condition does not enable, in any case, opening of the port 27a in so far as the two forces, pressure and spring, acting in the chamber 27 do not counterbalance the pressure present in the chamber 26. Likewise, the water in the chamber 27 cannot contaminate the water contained in the chamber 26, given the action of isolation between the chambers 26 and 27 performed by the membrane portion 31b of the element 31. In this step, the self-priming valve 22 continues to operate as described above.

At the end of supply, the pump 3 is de-activated. In this way, the self-priming valve 22 guarantees a sudden drop in pressure in the chamber 26 and at the driving inlet $12_{DR-IN}$. On the other side, the one-way valve 21 corresponding to the driving outlet $12_{DR-OUT}$ can close again, thanks to the action of the corresponding spring. This drop in pressure in the chamber 26 causes by means of the pilot line 25p of FIG. 7 the action on the membrane portion 31b of the element 30 that separates the two chambers 23 and 24 to cease: in this way, the piston 29, pushed by the spring 28 and by the pressure of the chamber 27 via the corresponding pilot line 12p of FIG. 7 can translate upwards, as viewed in the figures, thereby enabling the open/close element 30 to move back into its initial position, of opening of the port 27a. Raising of the piston 29, i.e., bending upwards of the membrane portion 31b, is preferably limited by a mechanical end-of-travel, here represented by the lower end of the central axial relief of the chamber 26.

In this condition, the main outlet $12_{OUT}$ is in fluid communication, via the chamber 27, with the main inlet $12_{IN}$, and hence with the brewing unit 1. The water present in the part of circuit comprised between the one-way valve 10 and the unit 1 can thus flow out through the main outlet $12_{OUT}$ towards the discharge container 11 or some other collection space.

As may be appreciated, operation of the valve 12' is essentially based upon the differential pressures that are set up at different moments in the chambers 26 and 27 via the respective pilot lines 25p and 12p of FIG. 7, in particular during and after activation of the pump 3. In particular, after the pump 3 is activated for preparation of the beverage, the open/close member 29-31 passes from the open condition to the closed condition, overcoming the force of the corresponding spring 28 as a result of the pressure of the water in the driving chamber 26, determined by actuation of the pump itself. Next, after the pump 3 is de-activated at the end of delivery of the beverage, the pressure in the driving chamber 26 decreases as a result of the spillage action determined by the valve 22 or similar device, thus enabling the open/close member 29-31 to return into the open condition, as a result of the force of the spring 28 and of the pressure transmitted by the pilot line 12p and present at the inlet $12_{IN}$, i.e., in the chamber 27.

Figure 8:
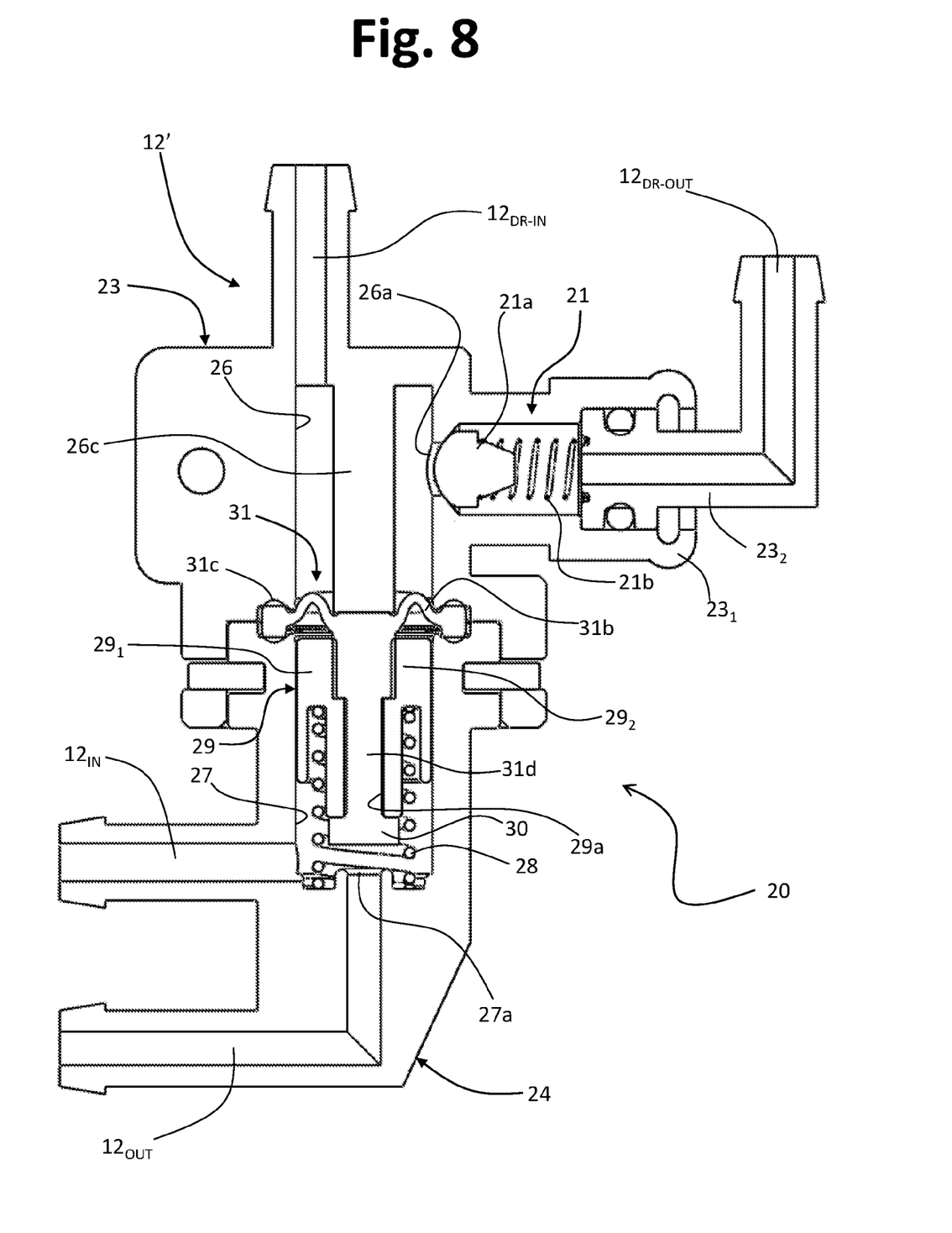
FIG. 8 illustrates, via an axial schematic cross section, a variant embodiment of a valve unit that can be used according to the present invention.

FIG. 8 is a schematic illustration of a possible variant embodiment of a valve or valve unit that can be used in accordance with the present invention. In this figure parts and elements already described have been designated once again by the same reference numbers as the ones used previously.

The unit 20 of FIG. 8 differs from the one illustrated previously basically as regards construction of the piston 29 and of the membrane element 31, which in this case integrates also the open/close element 30. As may be noted, in this case, the piston 29 has an axial passage 29*a*, traversed by a corresponding portion 31*d* of the membrane element, which departs downwards from the portion 31*b* and defines at its lower end the open/close element 30. Also in this case, the element 31 may be conveniently obtained from an elastic or resilient material, in particular via moulding. In one embodiment, in order to facilitate production of the open/close member consisting of the membrane element 31 and the piston 29, the latter is conveniently formed in two axial parts or halves 29₁ and 29₂, each of which defines a respective portion of the passage 29*a* and which can be fixed together, for example by snap action, so as to surround the portion 31*d* of the element 31 intermediate to the membrane portion 31*b* and to the open/close element 30.

From the foregoing description the characteristics of the present invention, as likewise its advantages, emerge clearly. Among the advantages, the following may be listed:

- the solution proposed is decidedly inexpensive, in view of elimination of a solenoid, and hence of the cost involved in its copper coil, necessary for operation of traditional discharge solenoid valves;
- the cost of the solution is further reduced in so far as no specific electrical wiring is required for connection and control of the hydraulically driven discharge valve; also the control electronics of the machine is simplified, there no longer existing the need for an electronic driving component, such as a triac, which is typically necessary in the case of discharge solenoid valves according to the prior art;
- the fact that driving of the discharge valve is of a hydraulic type enables increase of the sections of passage of the circuit parts relating to the discharge, which can be brought from a value of approximately 1 mm of diameter, traditionally envisaged in the case of use of solenoid valve, to approximately 2 mm of diameter, in the case of the present invention;
- production of the discharge valve, even when it integrates the self-priming valve or similar device for controlled spillage, is simple and inexpensive; added to this is the fact that the self-priming valve that can be used for implementation of the invention may be of a commercially available type, and hence with limited cost; also correct priming of the pump of the machine is, of course, guaranteed, given that air is eliminated from the circuit of the machine;
- operation of the discharge valve is reliable and substantially independent both of calibration of the spring of the usual one-way valve provided on the supply branch of the brewing unit and of the pressure generated in the aforesaid branch by the amount of precursor of the beverage present in the brewing unit (this pressure being also a function of the amount of ground coffee, for example when contained in a capsule); the time of triggering of the valve is moreover fast and guaranteed;
- hydraulic driving of the discharge valve does not have negative effects on reaching the correct pressures in the brewing unit of the machine;
- the use of a membrane element that isolates the two chambers internal to the discharge valve prevents any risks of contamination of the water that is to produce the beverage.

Of course, without prejudice to the principle of the invention, the embodiments and the details of construction may vary widely with respect to what has been described and illustrated herein purely by way of non-limiting example, without thereby departing from the scope of the invention.

In embodiments described previously, the hydraulically driven discharge valve 12' and the device 22, such as a self-priming valve, are integrated in a single valve unit 20. It should, however, be pointed out that this does not constitute an essential characteristic of the invention, given that, in possible variant embodiments, the device 22 may be mounted even in a remote position with respect to the valve 12', downstream of the connector designated by 25, for example connected to the latter via an appropriate duct.

In other embodiments of the invention, the necessary fluid-tightness between the chambers 26 and 27 could be obtained, instead of by the membrane portion of an element such as the one designated by 31, by means of one or more rings that surround the outside of the piston 29, for example of an O-ring type, which slide along the inner surface of the chamber 27. Use of a membrane element must in any case be considered preferable, in so far as it enables increase in the reliability of the valve in view of the absence of sealing elements subject to sliding.

The invention claimed is:

1. A machine for preparing beverages, comprising a hydraulic circuit including:
   - a brewing unit;
   - a water tank;
   - a pump having an inlet connected in fluid communication to said tank and an outlet or delivery connected in fluid communication to the brewing unit;
   - a normally closed one-way hydraulic valve, set between the pump and the brewing unit for enabling a flow of water towards the brewing unit when pressure of the water delivered by the pump exceeds a predetermined threshold;
   - heating means for heating the water delivered by the pump;
   - a normally open discharge valve having:
     - a main inlet, connected between said one-way hydraulic valve and the brewing unit;
     - a main outlet, connected towards a discharge space;
     - an open/close member, which is set between the main inlet and the main outlet and is suitable to assume an open condition and a closed condition, in which the open/close member enables and prevents, respectively, a flow of water between said main inlet and said main outlet, the open/close member being urged by a corresponding spring towards the open condition,
   - wherein the discharge valve is a hydraulically driven valve, which further comprises a driving chamber, for hydraulic driving of the open/close member, and an auxiliary inlet of the driving chamber, connected to the delivery of the pump,
   - the discharge valve moreover having an outlet of the driving chamber, connected in fluid communication to a device for spillage of water from the driving chamber, and
   - wherein the discharge valve has an auxiliary outlet of the driving chamber, connected to the brewing unit in such a way that water delivered by the pump passes through the driving chamber before reaching the brewing unit, and such that:
     - after the pump is activated to prepare a beverage, the open/close member passes from the open condition to the closed condition, overcoming the force of the corresponding spring as a result of the pressure of the water in the driving chamber determined by operation of the pump; and after the pump is de-activated at the end of delivery of the beverage, the pressure in the driving chamber decreases due to the spillage determined by the device for spillage, thus enabling the open/close member to return to the open condition as a result of the force of the spring and of the pressure present at the main inlet of the discharge valve.

2. The machine according to claim 1, wherein the device for spillage comprises a device for self-priming.

3. The machine according to claim 1, wherein the discharge valve and the device for spillage are integrated in a single valve unit.

4. The machine according to claim 1, wherein:
the discharge valve comprises a further chamber that communicates with the main inlet and the main outlet, the further chamber having a bottom in which a valve seat is defined;
the open/close member comprises a membrane element to which a piston is associated, supporting an open/close element that is able to co-operate with the valve seat, said spring being operatively set between the piston and the bottom of the further chamber;
the membrane element has a membrane portion, which sealingly separates the driving chamber from the further chamber, the membrane portion being elastically flexible for enabling displacement of the piston and of the open/close element associated thereto with respect to the valve seat.

5. The machine according to claim 4, wherein the open/close element and the membrane element are made of a single piece.

6. The machine according to claim 5, wherein the piston comprises two parts, each defining a respective portion of an axial passage of the piston, the two parts being coupled together to surround a portion of the membrane element that is intermediate to the membrane portion and the open/close element.

7. The machine according to claim 1, wherein between the auxiliary outlet of the driving chamber and the one-way valve a further one-way valve is set.

8. The machine according to claim 7, wherein the auxiliary outlet of the driving chamber comprises a connector of the discharge valve within which the further one-way valve is integrated.

9. The machine according to claim 8, wherein the connector comprises two parts sealingly coupled together.

10. The machine according to claim 1, wherein the device for spillage of water from the driving chamber has an outlet in fluid communication with the water tank or the inlet of the pump.

11. A normally open discharge valve for a machine for preparing beverages having:
a main inlet, designed for connection between a one-way hydraulic valve and a brewing unit of the machine;
a main outlet, designed for connection towards a discharge space;
an open/close member, which is set between the main inlet and the main outlet and is designed to assume an open condition and a closed condition, in which the open/close member enables and prevents, respectively, a flow of water between said main inlet and said main outlet, the open/close member being urged by a corresponding spring towards the open condition;
the normally open discharge valve being a hydraulically driven valve, which further comprises:
a driving chamber for hydraulic driving of the open/close member;
an auxiliary inlet of the driving chamber, designed for connection to the delivery of a pump of the machine;
an outlet of the driving chamber, designed to be connected in fluid communication to a device for spillage of water from the driving chamber;
wherein the normally open discharge valve further comprises an auxiliary outlet of the driving chamber, designed for connection to the brewing unit of the machine in such a way that water delivered by the pump passes through the driving chamber before reaching the brewing unit of the machine.

12. The normally open discharge valve according to claim 11, integrating the device for spillage to form a valve unit, the device for spillage comprising a device for self-priming.

13. The valve according to claim 11, comprising a further chamber that communicates with the main inlet and the main outlet, the further chamber having a bottom in which a valve seat is defined;
wherein the open/close member comprises a membrane element associated to which is a piston that supports an open/close element which is able to co-operate with the valve seat, said spring being operatively set between the piston and the bottom of the further chamber;
and wherein the membrane element has a membrane portion, which sealingly separates the driving chamber from the further chamber, the membrane portion being elastically flexible for enabling displacement of the piston and of the open/close element associated thereto with respect to the valve seat.

14. The normally open discharge valve according to claim 13, wherein the open/close element and the membrane element are made of a single piece.

15. The normally open discharge valve according to claim 14, wherein the piston comprises two parts, each defining a respective portion of an axial passage of the piston, the two parts being coupled together to surround a portion of the membrane element that is intermediate to the membrane portion and the open/close element.

16. The normally open discharge valve according to claim 11, wherein between the auxiliary outlet of the driving chamber and the one-way valve a further one-way valve is set.

17. The normally open discharge valve according to claim 16, wherein the auxiliary outlet comprises a connector within which the further one-way valve is integrated.

18. An integrated valve unit comprising a hydraulically driven discharge valve according to claim 11 and the device for spillage of water from the driving chamber.

19. The integrated valve unit according to claim 18, wherein the device for spillage of water is a self-priming device.

20. The normally open discharge valve according to claim 11, wherein the device for spillage of water from the driving chamber has an outlet in fluid communication with the water tank or the inlet of the pump.

* * * * *